United States Patent
Bierwith

(10) Patent No.: US 8,127,476 B2
(45) Date of Patent: Mar. 6, 2012

(54) QUICK RELEASE SCREW CONNECTOR FOR EARTH-MOVING EQUIPMENT

(75) Inventor: Robert S. Bierwith, Alameda, CA (US)

(73) Assignee: Berkeley Forge & Tool, Inc., Berkeley, CA (US)

( * ) Notice: Subject to any disclaimer, the term of this patent is extended or adjusted under 35 U.S.C. 154(b) by 14 days.

(21) Appl. No.: 12/641,068

(22) Filed: Dec. 17, 2009

(65) Prior Publication Data
US 2010/0162594 A1    Jul. 1, 2010

Related U.S. Application Data

(60) Provisional application No. 61/139,503, filed on Dec. 19, 2008.

(51) Int. Cl.
*E02F 9/28* (2006.01)
(52) U.S. Cl. .......................................... 37/455; 172/772
(58) Field of Classification Search .................... 37/450, 37/451, 452, 453, 55, 456, 457, 458, 459, 37/454, 455; 411/106, 249, 265, 307, 308, 411/426, 436; 172/701.2, 701.3, 719, 753, 172/772, 772.5; 403/409.1, 418, 420
See application file for complete search history.

(56) References Cited

U.S. PATENT DOCUMENTS 1,775,984 A * 9/1930 Younie .......................... 37/452
(Continued)

*Primary Examiner* — Robert Pezzuto
*Assistant Examiner* — Jamie L McGowan
(74) *Attorney, Agent, or Firm* — Kilpatrick Townsend & Stockton LLP

(57) ABSTRACT

A connector for earth-moving equipment subjected to contact with earth, abrasive materials and the like has a nut with a body and a hole extending through the body. A bolt with a shank adapted to extend into the hole has an enlarged head at one end of the shank. Cooperating thread formations are defined on the shank and in the hole. The thread formations have cooperating matching cross-sections that decrease from a vicinity of the head of the screw towards the other end of the screw and that extend over a circumference of less than 360° and typically of no more than 270°. The connector is adapted to connect various components, including teeth and adapters, to each other and to lips at the front end of earth moving buckets and the like.

27 Claims, 13 Drawing Sheets

U.S. PATENT DOCUMENTS

| | | | |
|---|---|---|---|
| 2,204,829 A * | 6/1940 | Shippee et al. | 411/554 |
| 2,261,369 A * | 11/1941 | Henry et al. | 411/554 |
| 2,688,894 A * | 9/1954 | Modrey | 411/34 |
| 4,404,760 A * | 9/1983 | Hahn et al. | 37/459 |
| 4,755,092 A * | 7/1988 | Yaniv | 411/554 |
| 4,762,450 A * | 8/1988 | Schwind et al. | 411/34 |
| 5,205,057 A * | 4/1993 | Garman | 37/458 |
| 5,564,206 A * | 10/1996 | Ruvang | 37/458 |
| 5,718,070 A * | 2/1998 | Ruvang | 37/459 |
| 5,913,605 A * | 6/1999 | Jusselin et al. | 37/451 |
| 6,108,950 A * | 8/2000 | Ruvang et al. | 37/452 |
| 6,321,471 B2 * | 11/2001 | Munoz et al. | 37/456 |
| 6,430,851 B1 * | 8/2002 | Clendenning | 37/457 |
| 6,439,796 B1 * | 8/2002 | Ruvang et al. | 403/157 |
| 6,799,387 B2 * | 10/2004 | Pippins | 37/456 |
| 6,826,855 B2 * | 12/2004 | Ruvang | 37/450 |
| 6,848,203 B2 * | 2/2005 | Hohmann et al. | 37/446 |
| 7,162,818 B2 * | 1/2007 | Ruvang et al. | 37/456 |
| 7,178,274 B2 * | 2/2007 | Emrich | 37/453 |
| 7,640,684 B2 * | 1/2010 | Adamic et al. | 37/456 |
| 7,640,685 B2 * | 1/2010 | Emrich | 37/457 |
| 7,707,755 B2 * | 5/2010 | Lopez Almendros et al. | 37/457 |
| 7,788,830 B2 * | 9/2010 | Woerman et al. | 37/456 |
| 2009/0199442 A1 * | 8/2009 | Woerman et al. | 37/457 |
| 2010/0236108 A1 * | 9/2010 | Ruvang | 37/452 |

* cited by examiner

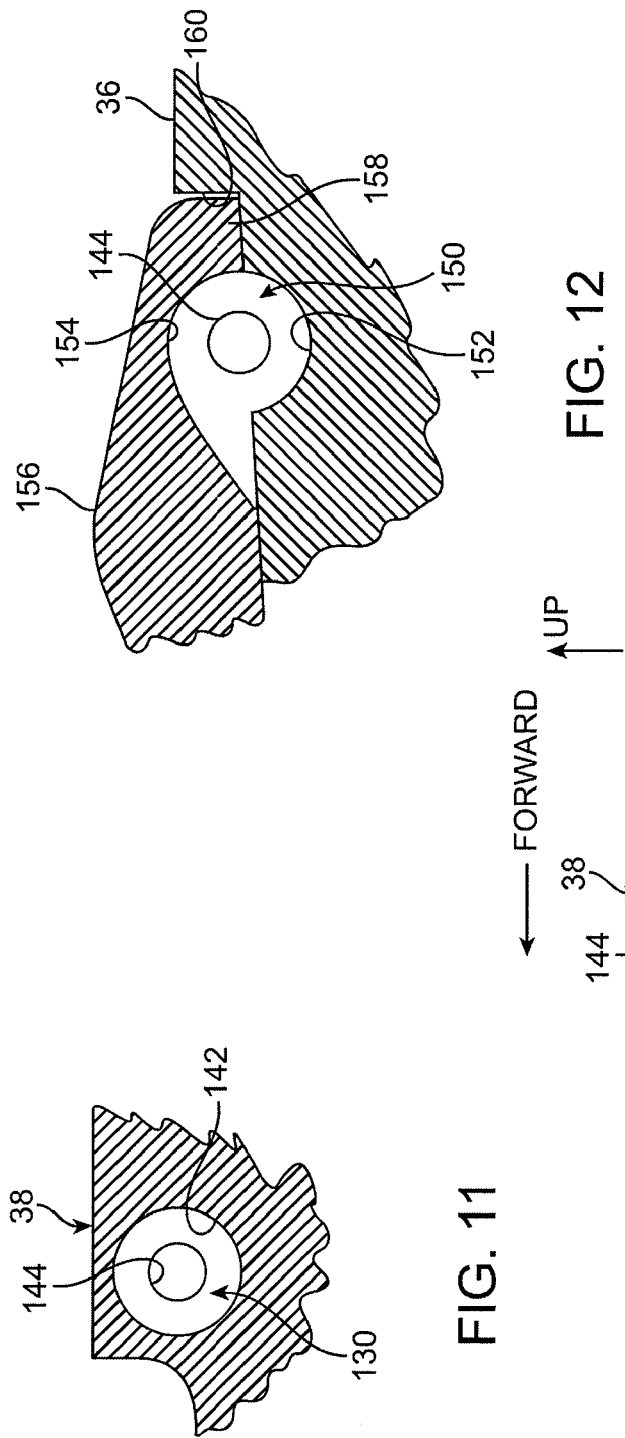

QUICK RELEASE SCREW CONNECTOR FOR EARTH-MOVING EQUIPMENT

CROSS-REFERENCES TO RELATED APPLICATIONS

This application claims priority from pending provisional patent application No. 61/139,503 filed Dec. 19, 2008, the disclosure of which is incorporated by reference.

BACKGROUND OF THE INVENTION

The present invention is directed to a screw connector for earth-moving equipment and the like adapted to secure components of the equipment to each other with a screw-nut connection that remains operable in environments involving earth, dirt, abrasives and the like.

Earth-moving equipment, such as power-driven shovels, loaders, scoops, dippers and the like, typically has a bucket, the earth-digging front end of which is normally defined by a generally U-shaped heavy-duty lip that is suitably fastened to the bucket. The lip includes a plurality of digging teeth which project from a front edge of the lip as well as wear plates which line interior surfaces of the lip to protect it from being worn down by earth, coal and the like into which the lip is pushed during earth-moving maneuvers. The teeth mounted to the lip are subject to much wear and require frequent replacement. To accommodate such replacements without requiring undue labor, the teeth are typically removably attached to an adaptor which in turn is secured to the lip.

In the past, wear plates lining the inside of the lip were welded onto the lip so as to not obstruct the rearward movement of earth and the like over the lip into the bucket while preventing the lip per se from being worn down by earth moving across it. Replacing welded-on wear plates from the lip is labor-intensive. First, the welds securing the plates to the lip must be removed and ground down so that a new wear plate can be installed. Next, the plates must be positioned on the lip and then welded onto the lip to securely mount them thereon. This task has to be repeated each time a wear plate must be replaced.

SUMMARY OF THE INVENTION

To overcome disadvantages of prior art power-driven earth-moving equipment connectors for components attached to lips, buckets and the like of the equipment, the present invention provides a unique screw connection defined by a screw cooperating with an appropriately shaped nut. The screw of the connection typically has a tapered shank and a head for rotating the shank about its axis and for engaging a component of an earth moving equipment that is to be attached to another component of the equipment. The screw further has a thread that extends over less than one full rotation or circumference of the screw, that is, that extends over less than 360° and that preferably extends over no more than about a three-quarter turn (270°) of the screw. The thread cross-section tapers over its circumferential length and has a maximum cross-section at a point in the vicinity of the head of the screw. The smallest cross-section of the thread is at the other end of the thread. The nut cooperating with the threaded shaft has a complementary, tapered thread that is configured to receive the tapered thread on the shaft of the screw.

To connect the screw and the nut to each other, typically with one or more components between them, the screw is aligned with the corresponding bore in the nut and rotated three-quarters of a turn. At the beginning of the turn, the relatively small end of the thread at the end of the screw shank remote from the head is loosely received in the much wider thread of the nut. As a result, there is ample space between the threads on the screw shank and in the nut hole through which sand, abrasives and other materials that might become lodged between the opposing threads and interfere with properly securing the screw to the nut can readily drop downwardly and away from the threads so that the screw can be fully rotated through the designated, e.g. three-quarter, turn, thereby firmly securing the parts between the nut and the screw head to each other.

To signal to the operator when the screw has been fully inserted into the nut, e.g. by rotating it through the required three-quarters of a turn, the screw and the nut are preferably provided with visual indicators that signal to the operator whether the required turn of the screw has been completed. For example, the screw may be provided with a laterally extending pin that engages a stop or the like on the nut. Other arrangements for determining the completion of the required turn can of course be used.

Should replacement of one of the parts of the components secured by the screw connection be required, the operator engages the screw head, rotates it in the opening direction, and then withdraws the screw from the threaded nut hole to enable replacement of the part or parts in question. As soon as the screw and the nut have been slightly moved in the opening direction, the threads on them become separated and contaminants that may be present between the opposing threads cannot interfere with fully opening the connection.

BRIEF DESCRIPTION OF THE DRAWINGS

FIGS. 11-13 are fragmentary, cross-sectional views which are taken on lines 10-10, 11-11 and 12-12, respectively, of FIG. 9;

DESCRIPTION OF THE PREFERRED EMBODIMENTS

Figure 1:
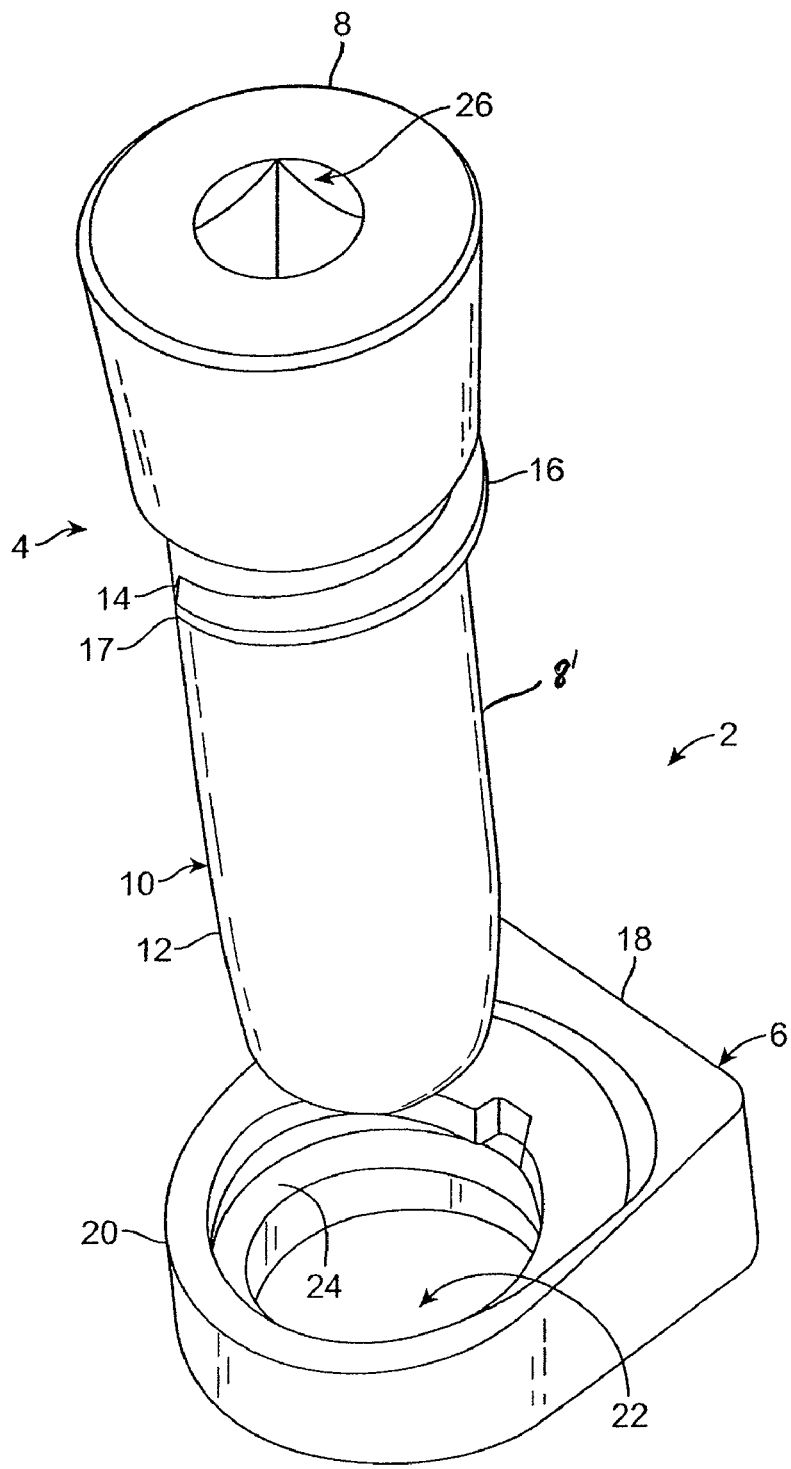
FIG. 1 is a perspective view of a screw and a cooperating nut constructed in accordance with the present invention and provided with respective threads that extend over less than the entire circumference of the screw and the hole and which have cooperating cross-sections that taper from the vicinity of the screw head towards the other end.
Figure 2:
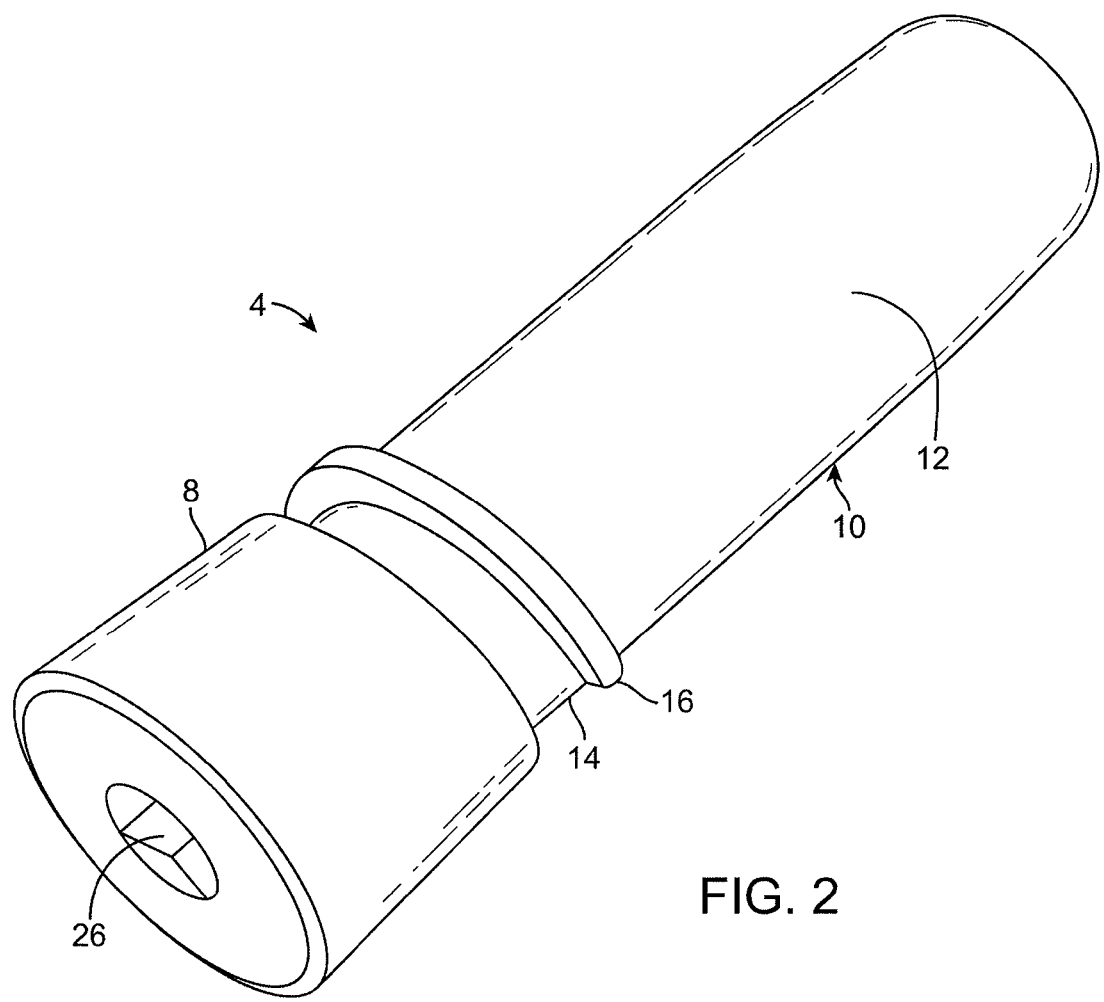
FIG. 2 is a perspective view of a screw constructed in accordance with the present invention and to better illustrate the extent and configuration of the thread.
Figure 3:
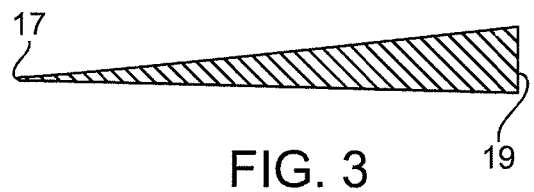
FIG. 3 is a schematic representation of the cross-section of the thread on the screw shown in FIGS. 1 and 2 and shows that the cross-section of the thread is largest in the vicinity of the screw head and is smallest at the thread.

Referring to FIGS. 1-3, a screw connection 2 constructed in accordance with the present invention has a screw or threaded bolt 4 and a cooperating nut 6. Screw 4 has a screw head 8 at its "upper end" and a shaft 10 that extends coaxially away from the head in a "downward" direction, as illustrated in FIG. 1. The shaft is preferably slightly tapered in a downward direction (away from the screw head) and includes a smooth lower portion 12 and an upper portion 14 over which a three-quarter turn (270°) thread 16 extends from the vicinity of the screw head 8, e.g. beginning at about and preferably slightly below the lower end of the screw head 8 and extending downwardly at the selected helix angle.

The cross-section of thread 16 and in particular its height is largest at its uppermost end 19 (in the vicinity of the screw head). It gradually and linearly decreases in a downward direction to a thread end point 17 that is typically slightly rounded. FIG. 3 schematically illustrates along a straight line the decreasing cross-section (and therewith also the decreasing axial extent) of the thread from its uppermost point 19 to its lowermost end point 17. In the preferred embodiment, the periphery of thread 16 also includes a slight downward taper in the axial direction of the shaft 10, typically at the same angle as the taper of the shaft, although this taper can be dispensed with if desired.

Nut 6 may have a variety of exterior dimensions and configurations to suit particular applications. The nut illustrated in FIG. 1 has a straight portion 18 joined by a semicircular portion 20 and defines a through hole 22 including a thread 24 that is complementarily shaped to thread 16 on screw 8 so that the screw can be threadably received by the thread in nut 6.

To connect screw 8 to nut 6, shaft 12 of the screw is axially aligned with hole 22 in base 6 and is then axially advanced through the hole until thread 16 on the screw engages thread 24 on the nut. Rotation of the screw relative to the nut is continued through the entire arc over which the threads extend, in the presently preferred embodiment over an arc of about 270°. To facilitate turning of the screw, screw head 8 includes a non-circular socket, for example a square socket 26 that extends in the axial direction. Other socket configurations or other means for rotating the screw, such as a conventional hexagonal head, for example, can be used.

To signal the operator that he has or has not completed the required three-quarter turn of the screw to firmly engage it with the nut, the screw may be provided with a pin or the like (not shown) which engages an appropriately placed stop in the nut (not shown), or vice versa. So long as the pin does not engage the stop, the operator knows that the screw has not been completely turned, and when the pin is engaged with the stop, the operator is signaled that the required three-quarter turn has been completed and no further turning of the screw is possible.

Due to the decreasing cross-section of thread 16 on screw 8, there will be play between it and the corresponding thread 24 in nut hole 22 through which loose sand, dirt and the like, if any, can escape to prevent contaminants that may otherwise lodge between the cooperating threads from preventing a complete closure of the screw relative to the nut. Similarly, if, after a period of use, the screw connection 2 must be loosened, a very slight rotational movement of screw 8 relative to nut 6 disengages and separates the thread flanks of the screw and from the thread flanks in the nut. As a result, any contaminants that might have become lodged underneath screw head 8 and/or between the threads during normal use of the thread connection of the present invention are immediately freed and can drop out of the way. Any contaminants that might remain on the threads do not interfere with the opening of the screw because a slight turn of the screw relative to the base immediately separates the thread flanks. As a result, the contaminants no longer are an obstacle to the complete separation of the screw from the nut.

Figure 4:
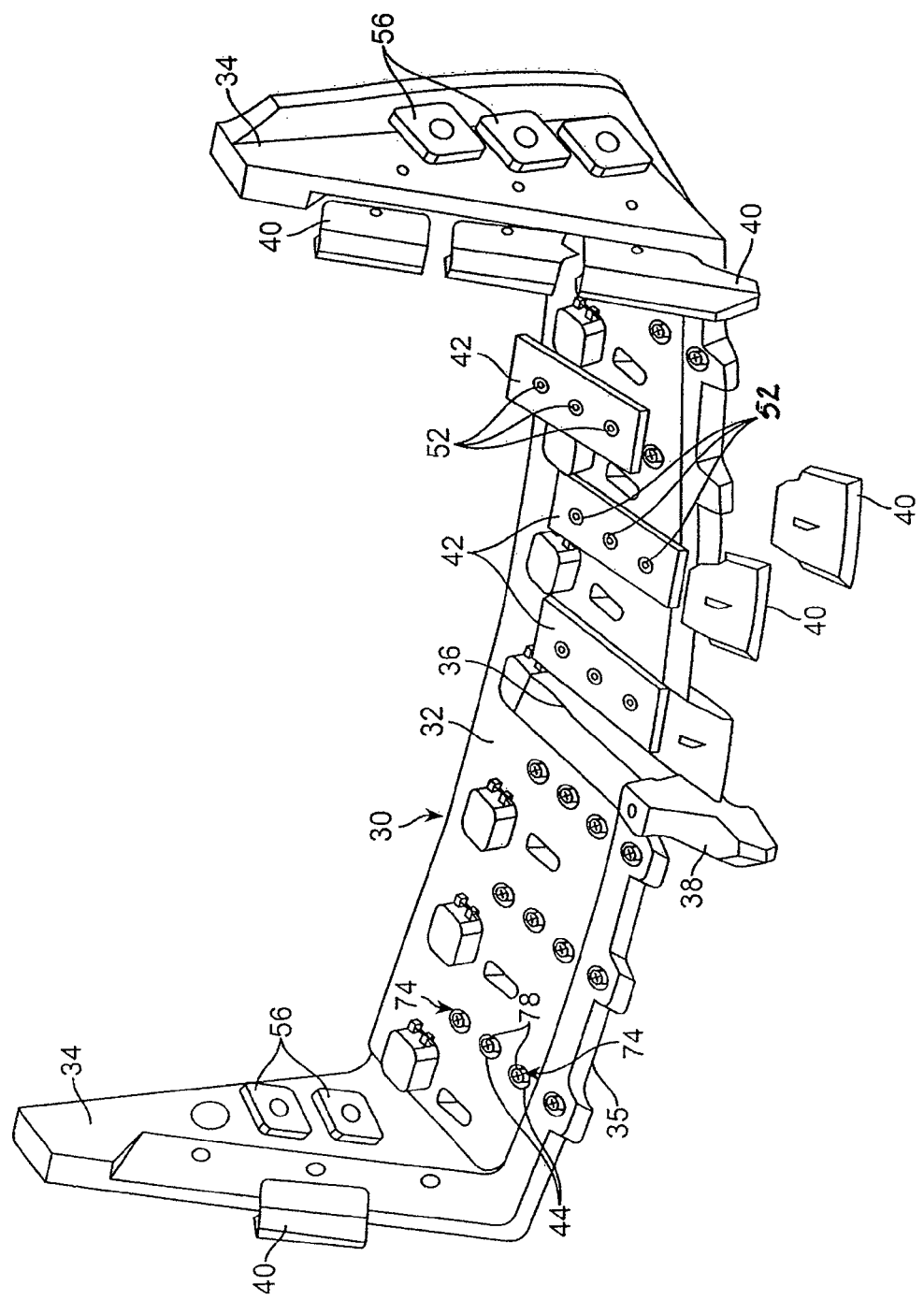
FIG. 4 is a perspective, schematic view of a lip for attachment to a bucket, a shovel and loader or the like and illustrates how wear plates are secured to the lip between tooth supporting adaptors with the improved screw connection of the present invention.
Figure 5:
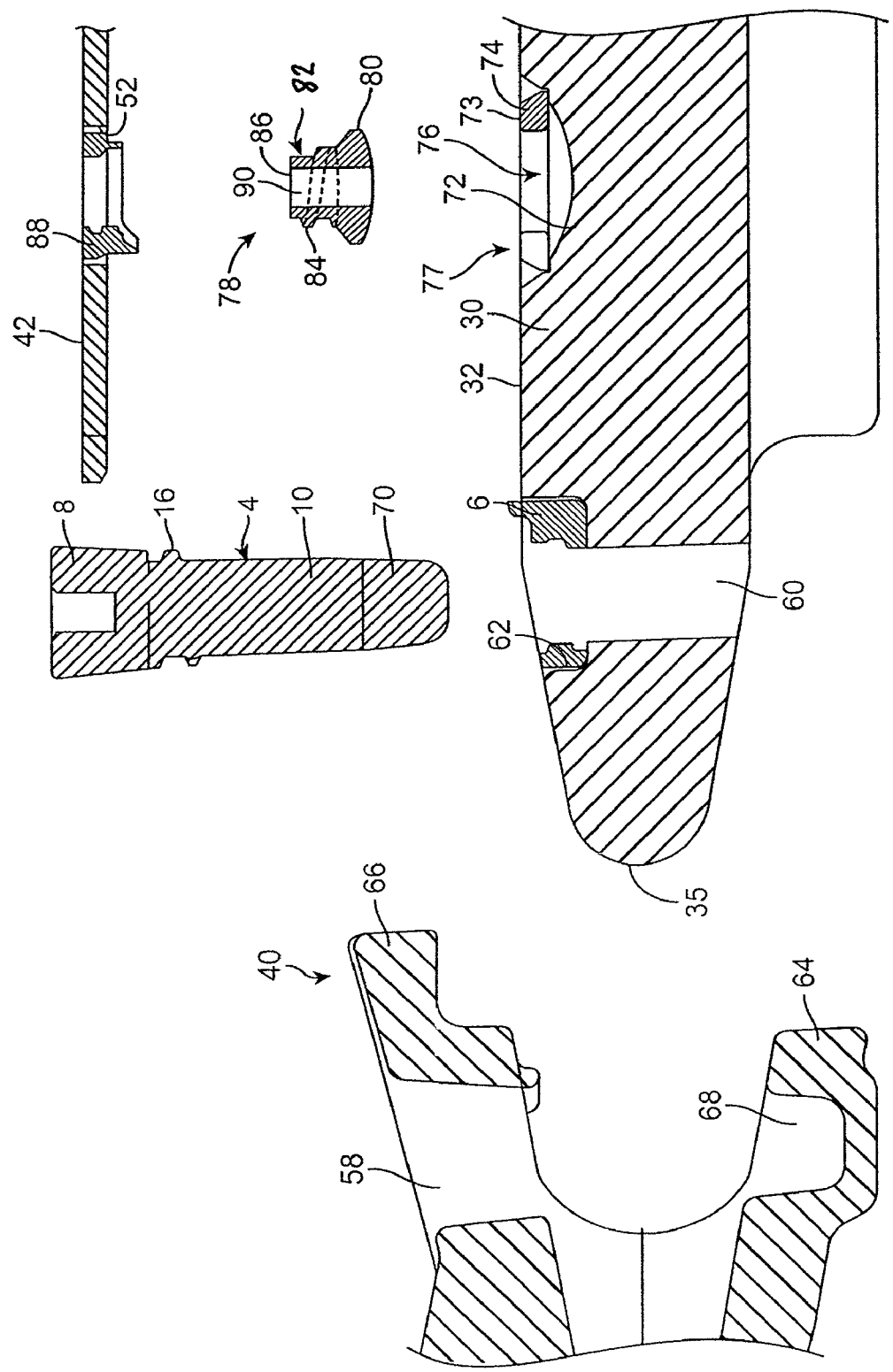
FIG. 5 is a perspective, exploded, side elevational view of portions of a lip, the shroud, the wear plate and the bolts and nuts used to secure them to each other.
Figure 6:
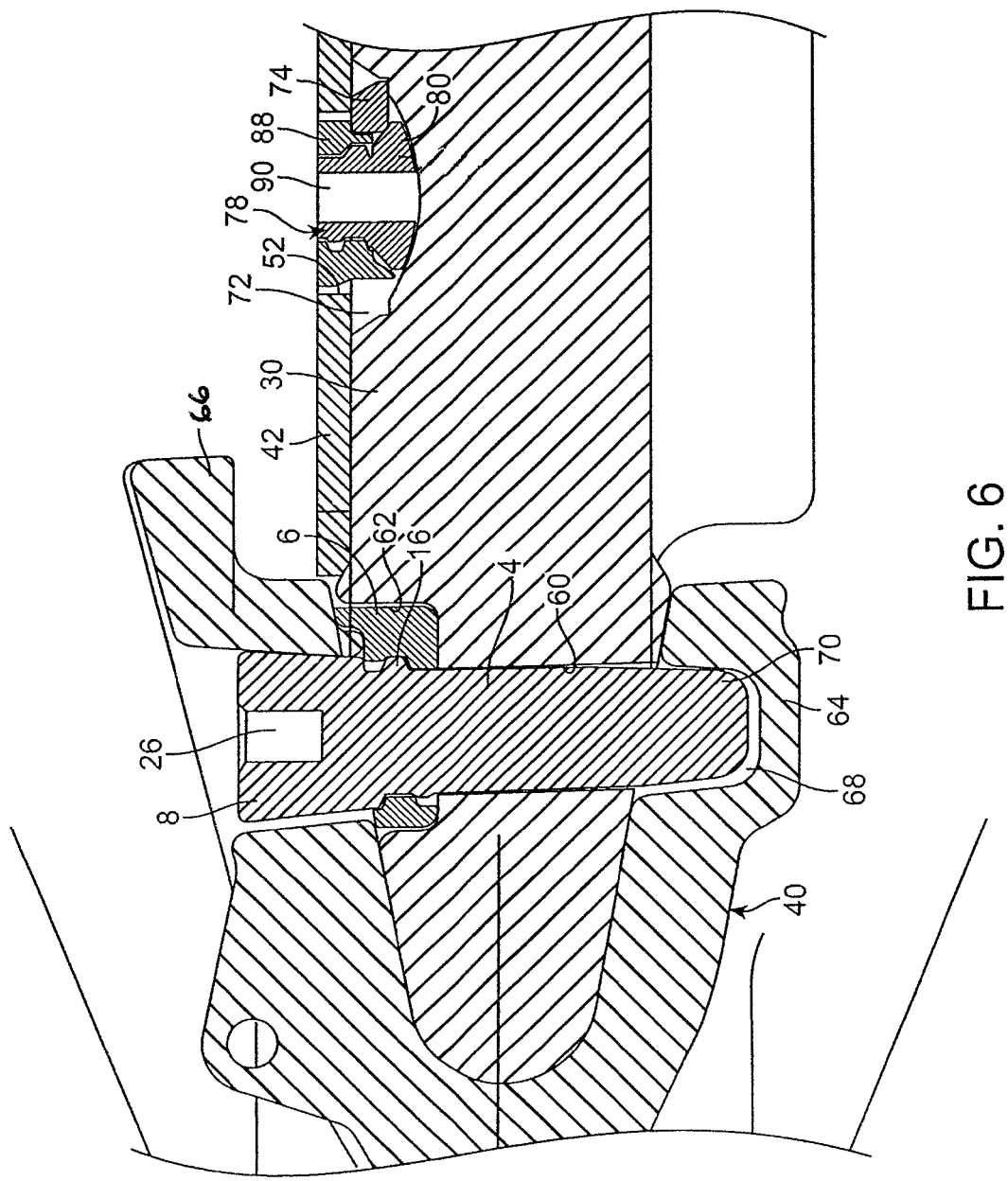
FIG. 6 is a cross-sectional view showing the parts illustrated in FIG. 5 in their assembled condition.

Referring to FIGS. 4-6, details of connecting various components such as wear plates and shrouds are illustrated in greater detail.

A lip 30 of a power-driven shovel, loader and the like that has a horizontal portion 32 and a front edge 35. A shroud 40 positioned between adjacent teeth is placed over the front edge of the lip. It has an aperture 58 through which the elongated shaft 10 of a screw 4 constructed as previously described (and shown in FIGS. 1 and 2) extends. Aperture 58 is aligned with a corresponding, preferably slightly tapered aperture 60 located proximate front edge 35 of the lip, as is shown in FIG. 6. The top of aperture 60 has an enlarged recess 62 which receives a nut 6 as shown in FIG. 1. By virtue of its configuration, nut 6 is non-rotatable inside recess 62. The shroud has upper and lower legs 64, 66 and a blind hole 68 in the lower leg that is aligned with hole 58 in the upper leg of the shroud.

Figure 10:
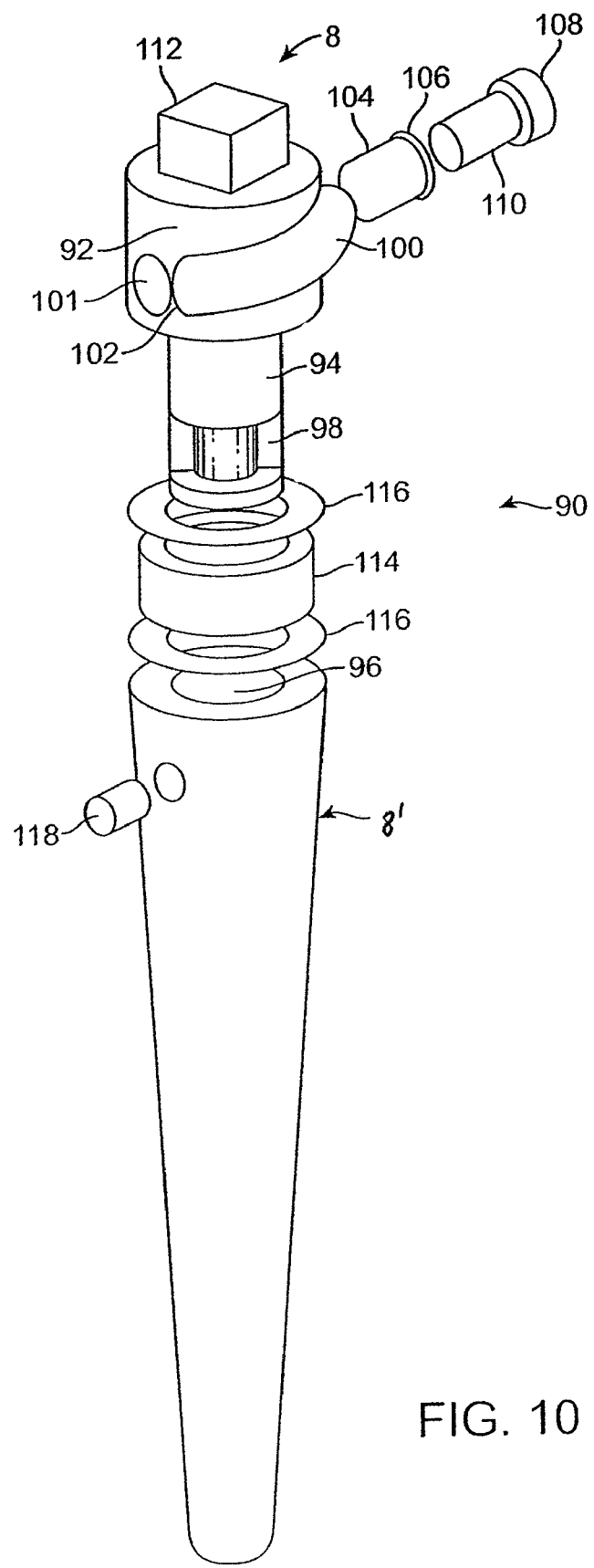
FIG. 10 is an exploded, perspective view of a connector constructed in accordance with the present invention that is particularly adapted for securing digging teeth to adapters.

After nut 6 has been placed inside recess 62 and the shroud has been placed over the front edge 35 of the lip, screw 4 is lowered through aperture 58 until its thread 16 engages the corresponding thread in nut 6. Following turning of the screw through three-quarters of a turn, the screw is firmly anchored to the upper leg 66 of the shroud, its elongated shaft 10 is in firm engagement with the aperture 60 in the lip, and a lowermost end 70 of the screw extends into the blind hole in the lower leg 64 of the shroud. With screw 4 firmly tightened against nut 6 as shown in FIG. 10, the shroud is fully secured to the lip and prevented from becoming loose (unless the screw is turned open) because the screw, including screw head 8, are completely disposed inside bores 58, 60 and 68 and are locked in place by the shroud until the screw is loosened.

Figure 7:
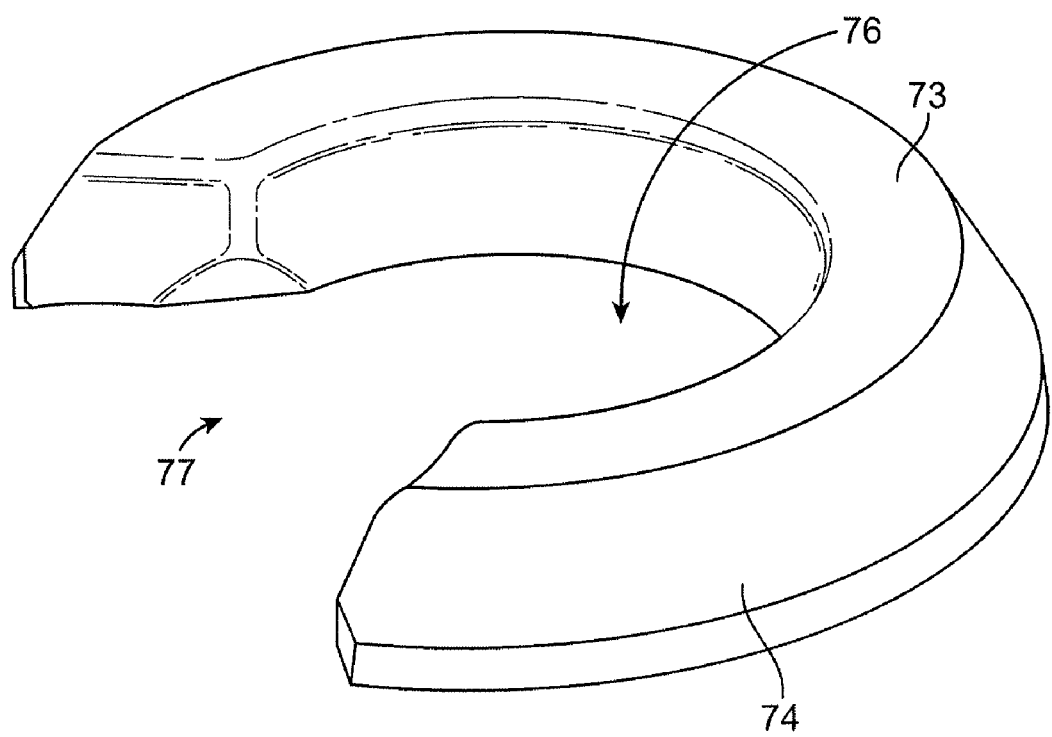
FIG. 7 is a perspective view of a screw retainer collar used in connection with the nut and screw illustrated in FIGS. 6 and 7.

Still referring to FIGS. 4-6, a wear plate 42 is secured to the horizontal portion 32 of the lip by initially forming an enlarged diameter, blind circular depression 72. A retainer 74, shown in FIG. 7, is welded in place inside the circular depression so that an upper surface 73 of the retainer is substantially flush with the horizontal surface 32 of the lip. The retainer extends over less than 360° to define an access 77 to a central opening 76 into which a screw 78 (shown in FIG. 6) can be inserted. The screw has an enlarged diameter head 80 and a shaft 82, including a thread 84 constructed as described above and illustrated in FIGS. 1-3. The diameter of shaft 82 and thread 84 is slightly less than the diameter of opening 76 in retainer 74 so that the screw can be slidably inserted by slipping its head 80 beneath the retainer until its shaft engages the walls of the opening defined by the retainer. The length of shaft 82 is selected so that an end surface 86 of the shaft is substantially flush with the upper surface of wear plate 42.

A nut 88 that cooperates with screw 78 is welded into a hole 90 in the wear plate that is to be attached to the plate. Nut 88 has a tapered thread as described above in connection with FIGS. 1-3.

To attach the wear plate to the lip, screws 78 are slipped beneath retainers 74 in the circular openings 72 in the lip so that their heads 8 are rotatably and removably retained beneath retainer 74 as seen in FIG. 6. The wear plate is placed onto the lip so that its nuts 88 are in substantial alignment with screws 78 in the lip, and a turning tool (not shown) is inserted into sockets 90 in the nuts to turn the nuts through the preferred angle of about 270° until a stop mechanism, constructed as described above, engages which signals the operator that the screw-nut connection has been completed and the wear plate has been firmly secured to the screw and therewith the lip.

FIG. 4 illustrates an entire lip 30 that is to be attached to a bucket or the like for moving earth and other materials (not shown). The lip has a generally U-shaped configuration and includes a horizontal portion 32 joined by upstanding lateral arms 34 at respective ends of the horizontal portion. A front edge 35 of the lip mounts a number of spaced-apart adaptors 36 to which digging teeth 38 are movably attached.

As previously described, shrouds 40 are located between adjacent teeth and arranged along the front edge of the lip. Shrouds are frequently also installed on the two forwardly facing surfaces of lateral arms 34.

Wear plates 42 are arranged on the top surface of horizontal portion 32 of the lip. For this purpose, the lip has embedded openings 44 defined by depressions 72 and opening 77 on retainer 74 through which screws 78 including their heads 80 and shafts 82 can be slidably inserted so that, thereafter, the screw cannot be pulled upwardly.

The hole pattern 52 in the wear plates corresponds to that of embedded openings 44 in the horizontal portion of the lip. Nuts 88 welded to the wear plates have tapered threads extending preferably over about three-quarters of their respective circumferences, as described above in connection with FIGS. 1-3. The nuts in the wear plates are aligned with screws 78 projecting through retainers in the lip, and the screws are tightened three-quarters of a turn until the pin on one of the nuts (not shown) and the screws and the cooperating stop (not shown) on the other one engage each other. This signals that the screw connection has been satisfactorily completed. When desired or otherwise needed, the wear plates applied to the lip can have other configurations; for example, a single wear plate can extend over the entire length and/or width of the lip.

When it is time to replace the wear plates, or only those wear plates which exhibit excessive wear, the respective screws thereof are loosened and withdrawn to disengage the wear plates from the screws, the worn wear plates are replaced with fresh ones, and the fresh wear plates are again secured to the horizontal portions 32 of the lip as described above. The loosening of the screws typically lifts the wear plates off the underlying lip surface, which facilitates the removal of the plates.

The entire process of replacing the wear plates only takes minutes as compared to the time-consuming removal of welded-on wear plates and their replacement with fresh wear plates, which must also be welded on as required in the prior art. Significant cost savings are thereby attained.

Wear pads 56 applied to the exterior and/or interior surfaces of upright lip arms 34 can be applied to the side arms in the same manner as wear plates 42 described in the preceding paragraphs.

In a preferred embodiment of the invention, the teeth 38 shown in FIG. 4 are attached to adapters 36 in an analogous manner with a screw and a nut (not separately numbered in FIG. 4) constructed and arranged analogously to the manner in which the shrouds are attached to the lip.

Preferably, the releasable connection between a tooth 38 and an adapter 36 employs a version of the bolt of the present invention which, in addition to the above-discussed thread of a decreasing axial height, includes a resilient member between the head 8 of the bolt and its shank 10 which biases the shank into a mating bore, as is further described below.

Referring to FIG. 10, the "axially resilient" bolt 90, like bolt 4 described above, has a bolt head 8 and a preferably tapered shank 8', although the shank could be of a cylindrical cross-section for a given application.

Head 8 of bolt 90 is defined by an enlarged diameter, upper section 92 from which a cylindrical shaft 94 depends downwardly. Shaft 94 is dimensioned so that it slidably fits into a hole 96 in shank 10 to allow shaft 94, and therewith head 8, to move axially and rotationally relative to the shank. Shaft 94 includes a recess 98 along a portion of its lower periphery which is spaced from the lower end of the shaft and which has a circumferential extent that equals the circumferential extent of helical screw thread 100. The axial length of recess 98 is selected so that head 8 can axially move relative to shank 10 over a desired distance that is selected to generate a desired force in the axial direction before and while the thread formation is tightened.

The helical thread 100 on the enlarged portion of head 8 extends over no more than 360° and, preferably, extends over an arc substantially less, for example an arc in the range between about 120° and 180°. A hole 101 extends across the diameter of enlarged head portion 92 so that one end of the hole is in substantial alignment with a lowermost end 102 of the thread and preferably immediately adjacent to the end of the thread. Although not clearly shown in FIG. 10, thread 100 has a decreasing axial height as shown in FIG. 3. A metal cap 104 with a rounded end is slipped into the hole so that its rounded end protrudes past the opening of the hole at the lower end 102 of the thread. The hole (not shown) includes an internal recess that engages an end flange 106 of the cap to retain the cap inside the hole and prevent it from being pushed out of the other end. When installed, as further described below, a resilient member, such as a plug 108 made of an elastomeric material, such as plastic or rubber, or a compression spring (not shown), has a shaft portion 110 that extends into the interior of cap 104. Rubber plug 108 includes an enlarged head which engages the surface of the bore into which shank 10 extends to keep it compressed, thereby urging the rounded end of the metal cap past the lower end 102 of the thread into a stop hole (not shown in FIG. 10) for releasably locking the bolt in place. For turning the bolt, head 108 is preferably provided with a connection, such as a square protrusion 112 (or hole, shown in FIG. 1), for turning the bolt with a wrench or the like.

Disposed between the upper end of shank 10 and the lower end of enlarged head portion 92 is a resilient member, for example a ring 114 constructed of a resilient material, such as rubber or plastic. In a preferred embodiment, relatively thin metal washers 116 are disposed between the respective ends of the ring and the opposing surfaces of shank 10 and enlarged head portion 92.

Axially resilient bolt 90 is assembled by initially placing an elastomeric ring 114 and washer 116 combination onto shaft 94 of head 12, and thereafter shaft 94 is inserted into hole 96 in the shank until recess 98 in the shaft of the head is axially positioned so that it overlies an aperture in shank 10 through which a locking pin 118 can be inserted. Upon insertion of the locking pin, its inner end projects into recess 98, thereby limiting axial movements between head 8 and shank 10 to the vertical height of the recess and circumferential or pivotal movements to the circumferential arc of the recess.

Figure 8:
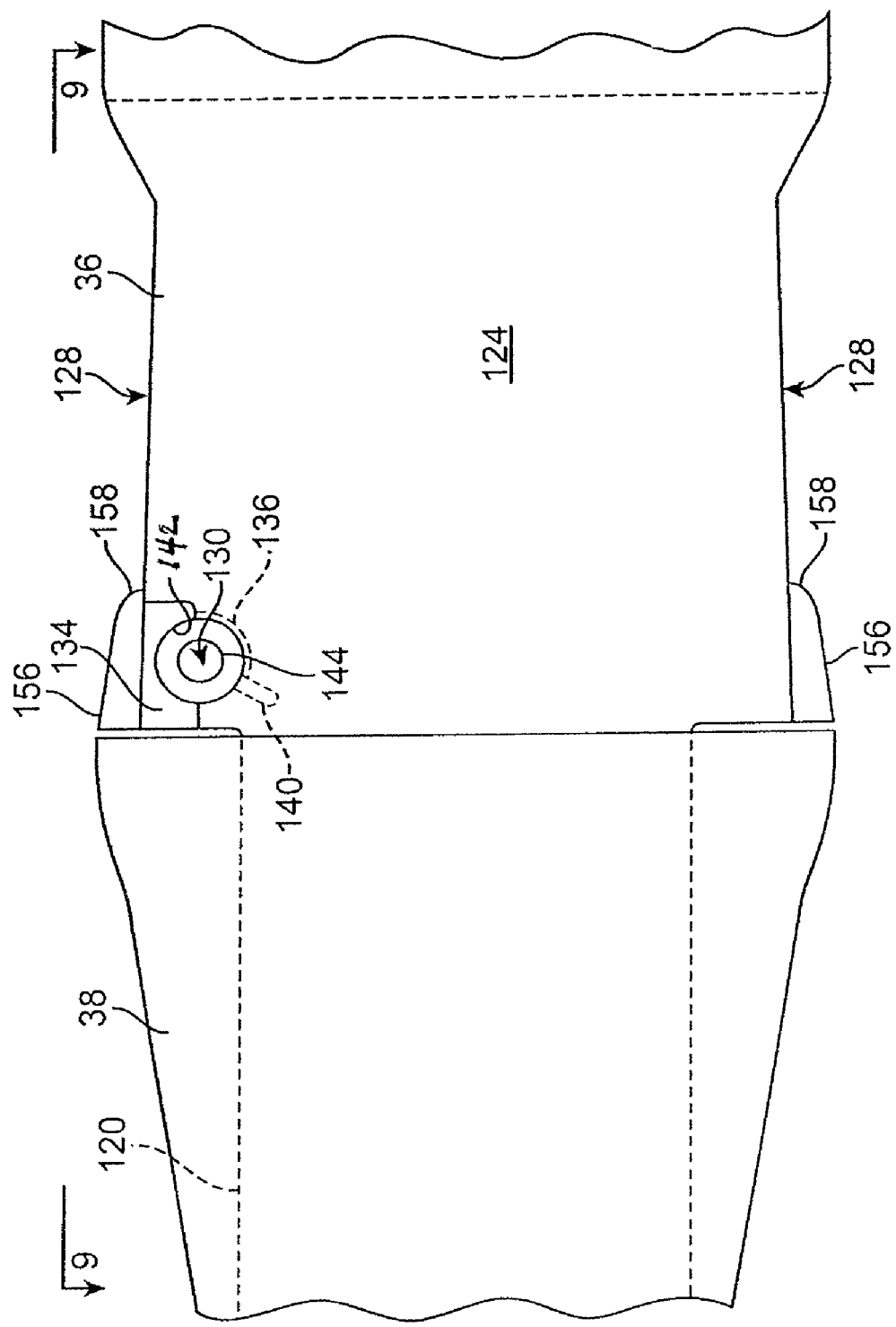
FIG. 8 is an underneath view of an adapter and an earth digging tooth attached thereto in accordance with the present invention.
Figure 9:
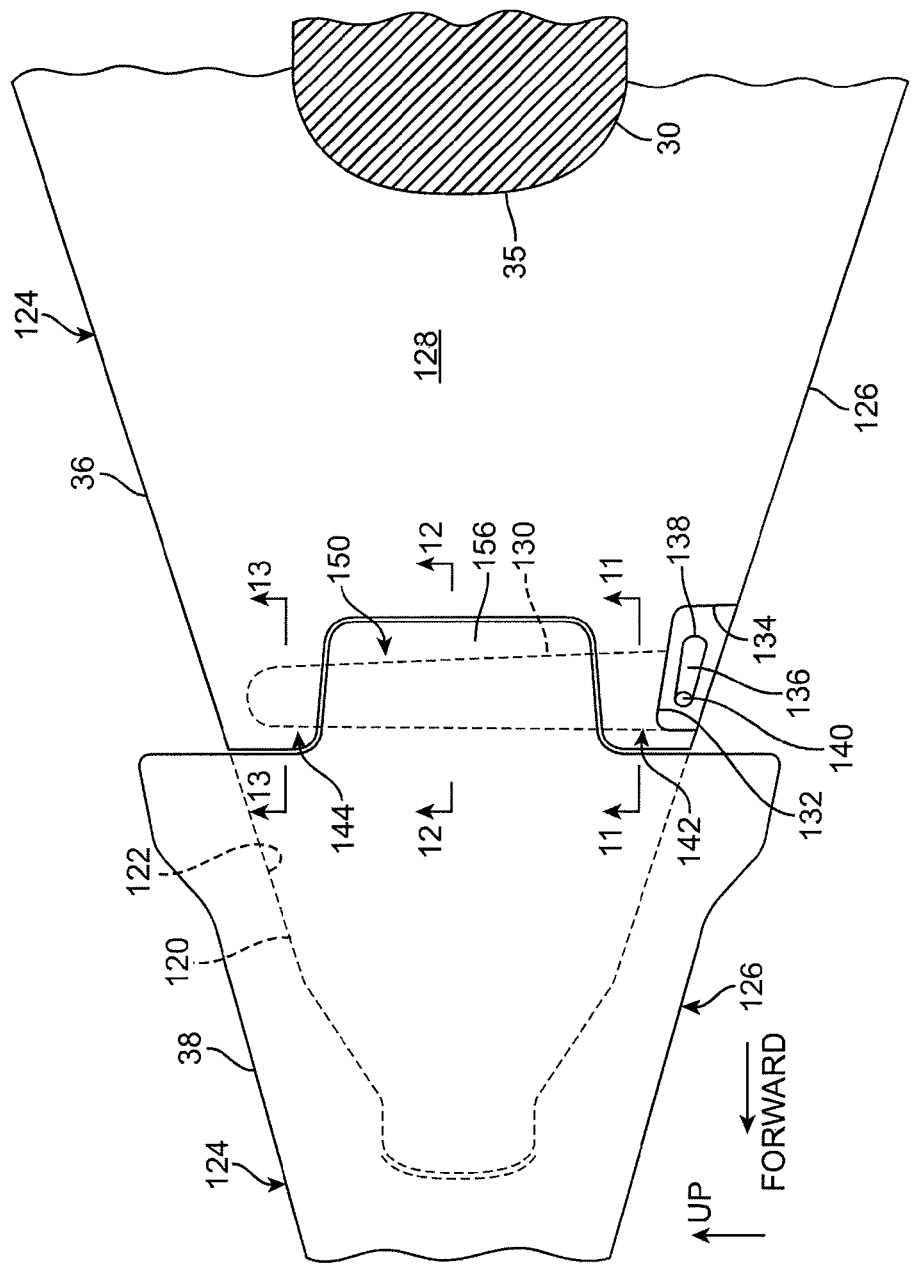
FIG. 9 is a side elevational view taken on line 9 of FIG. 8.

Referring to FIGS. 8-13, in one preferred embodiment of the invention, axially resilient bolt 90 is installed between an adapter 36 and a tooth 38 in an upright position. The adapter has a nose 120 that extends into and is snugly received in a rearwardly open cavity 122 inside tooth 38. The adapter-tooth assembly has upwardly and downwardly facing surfaces generally indicated by reference numeral 124, 126 which slopingly converge in a forward direction as shown in FIG. 9, and the assembly has generally upright sides 128 as seen in FIG. 8.

Although the bolt 90 can be installed at any place across the width of upper and lower surfaces 126, in the presently preferred embodiment of the invention a bore 130 that receives the axially resilient bolt 90 is arranged in the vicinity of one of the two upright sides 128 of the adapter-tooth assembly 36, 38, as seen in FIG. 8. Bore 130 is tapered, that is, it converges in an upward direction as seen in FIG. 9, and the larger, lower end of the bore is an open end 132 to provide access to the bore from the exterior. The other end of the bore may be blind, as shown in FIG. 9, or open (not shown in FIGS. 8-13).

The lower end 132 of bore 130 opens into a downwardly open, enlarged recess 134, the approximate forward half of which is a continuation of bore 130, and the aft portion of which extends rearwardly past the bore, as can be seen in FIG. 9. A helical groove 136, which is complementary to helical thread 100 on bolt 92, is arranged in the adapter wall defining bore 130 so that at least an upper end 138 of the groove is located within recess 134. At the lower end, helical groove 136 terminates in a stop hole 140, dimensioned to receive metal cap 104 when bolt 90 is installed. The lower end of the helical groove may be located partially or wholly inside bore 130 or within recess 134.

To secure tooth 38 to adapter 36, the cavity 122 of the tooth is slipped over nose 120 of the adapter and pushed rearwardly to the maximum extent possible, at which point both define bore 130, as is further described below. Thereafter the axially resilient bolt 90 is inserted into bore 130 until the tapered shank 8' of the bolt engages the correspondingly tapered surfaces of bore 130. Next the operator pushes downwardly on head 8 of the bolt to compress elastomeric ring 114 until the lower end 102 of helical thread 100 becomes aligned with the upper end of helical groove 138 in recess 134 of the adapter. Upon alignment, the operator turns head 8, for example with a wrench engaging the square drive projection 112 at the top of bolt head 8. Due to the compression of the resilient ring, an additional axial force, generated as head 8 is turned, reaches a maximum when the head has been turned over the full arc of the thread thereon, at which point resilient plug 108 pushes metal cap 104 into stop hole 140 in the adapter to thereby lock the bolt in place. Any possible force that might be encountered between the tooth and the adapter with bolt 90 secured in place cannot dislodge the bolt, and the firm and secure connection between the tooth and the adapter established by the bolt is maintained. In this context, it is noted that since the respective ends of bolt 90 are within the surrounding bore and are not directly accessible from the exterior, no encountered exterior force can cause the bolt to rotate and end cap 104 remains in place in stop hole 140.

When it is time to replace tooth 38 on adapter 36, the operator engages the actuator 112 at the top of head 92 with a wrench and turns it in the opposite, opening direction. To permit this, the stop hole engaging end of cap 104 is rounded, as shown, or otherwise tapered (not shown), so that, upon the application of a sufficient torque onto the bolt head, cap 104 is pushed out of and becomes disengaged from the stop hole, thereby enabling further rotational movement of the bolt until its thread 100 becomes disengaged from helical groove 136 in the adapter and can be removed.

In a preferred embodiment of the invention, bore 130 is divided into three axially extending sections. A lowermost bore section 142 and an uppermost bore section 144 are defined by full, 360° through bores 142, 144, respectively, as is illustrated in FIGS. 11 and 13.

A center section 150 of the bore is jointly defined by a rounded, approximately semicircular recess 152 formed into adapter 36 and a similar, at least partially circular cutout 154 formed in a rearwardly extending flange 156 of the tooth, a rearward end 158 of which is received in a recess 160 in the adapter as seen in FIG. 12.

For stability, the opposite side of tooth 38 has a similar, rearwardly extending flange 156 that is snugly received in a recess (not shown) in the adapter.

Tooth 38 and adapter 36 are assembled by pushing them together as far as permitted to substantially align sections 142, 144, 150 of bore 130, and the axially resilient bolt 90 is inserted into aperture 130 as far as possible. Thereafter, an axial force is applied to bolt head 8 until thread 100 becomes aligned with the thread receiving groove in the adapter. Bolt head 92 is then turned over the arc of its thread 100, which further presses the shank into tapered bore 130. The thus inserted bolt maintains the nose and the adapter locked to each other because the bolt and the opposing surfaces of the adapter and the tooth overlap and become immovably secured to each other until bolt 90 is loosened again as above described.

Figure 14:
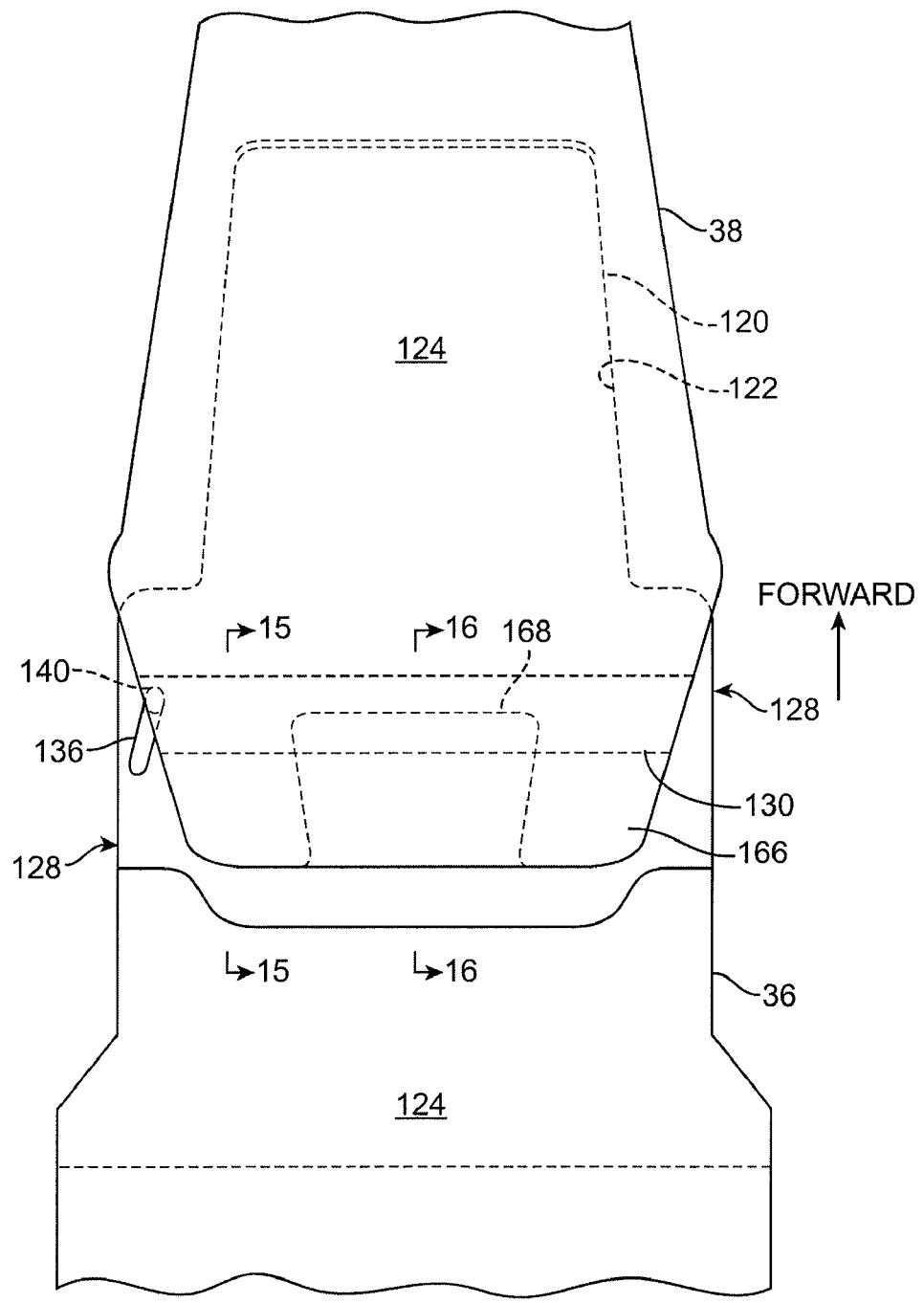
FIG. 14 is a plan view of another embodiment of the present invention and illustrates a tooth secured to an adapter with a horizontally oriented bolt.
Figure 15:
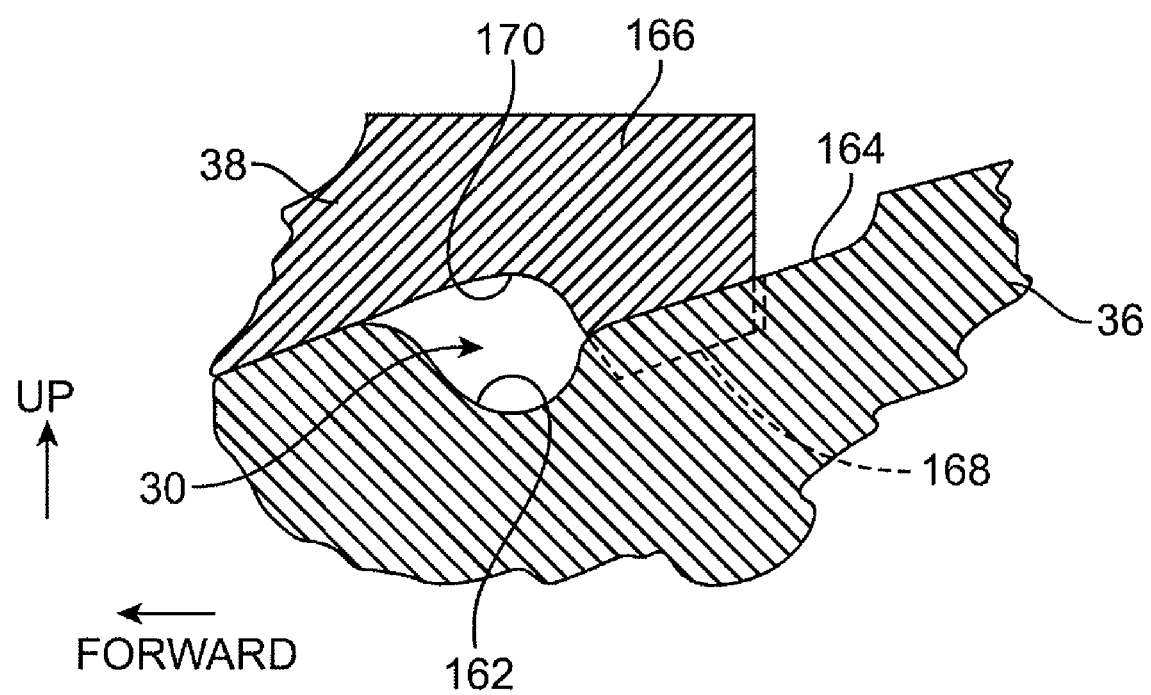
FIGS. 15 and 16 are fragmentary, cross-sectional views which are taken on lines 15-15 and 16-16 of FIG. 14.
Figure 16:
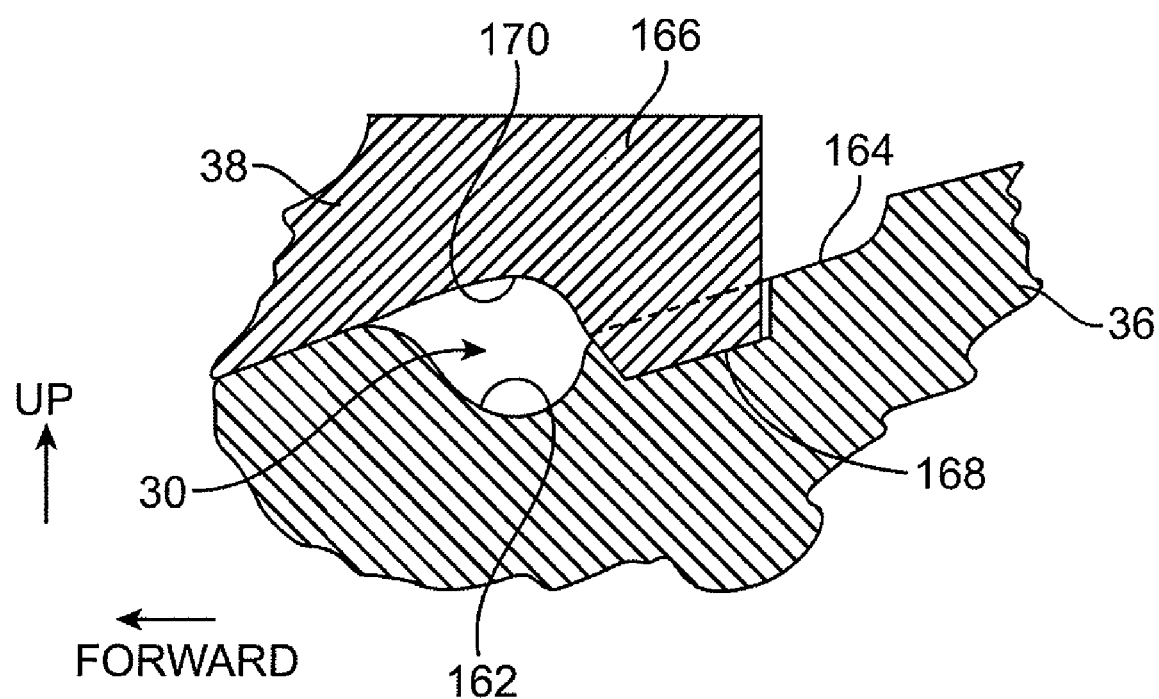

Referring to FIGS. 14-16, in another preferred embodiment of the present invention, the axially resilient bolt 90 is placed between adapter 36 and tooth 38 in a horizontal orientation and is located at the upper portion of the resulting assembly, that is, above adapter nose 120 that extends into the rearwardly open cavity 122 in the tooth.

In this embodiment, tapered bore 130 is defined by overlapping sections of the adapter and the tooth. The adapter defines a downwardly extending, generally horizontal, semicircular groove 162, an aft end of which terminates in an enlarged, rearwardly extending recess 164 in the adapter. The depression extends substantially over the full length of the bore.

Tooth 38 includes a relatively wide, rearwardly extending flange 166 which, on its underside, includes a boss 168, the inside of which defines an at least partially circular, downwardly open groove 170 that is aligned with groove 162 in the adapter to thereby define bore 130 between them in which bolt 92 is received.

To fully assemble adapter 36 and tooth 38 in the embodiment shown in FIGS. 14-16, the tooth is slipped over nose 120 of the adapter as far rearwardly as possible, at which point the semicircular grooves 162 and 170 in the adapter and the tooth, respectively, are in substantial alignment with each other. Bolt 90 is then inserted into bore 130, the elastomeric ring 114 between the head and the shank of the bolt is compressed until the helical thread 100 on the bolt becomes aligned with helical groove 136, and the bolt is rotated over the arc of its helical thread until metal cap 104 becomes aligned and is pushed into stop hole 140 by rubber plug 108, the head of which is engaged by the surface of bore 130 against which it rests. When cap 104 becomes aligned with the stop opening, the cap is driven into the opening, thereby fixing the bolt relative to the nut and the adapter and preventing the two from becoming separated from each other until the bolt is forcibly withdrawn as was described above.

As is true for the earlier discussed embodiment, tooth 36 includes another rearwardly extending flange 166 located on the underside (not shown in FIGS. 14-16) of the adapter.

A particular benefit of this embodiment of the invention is that by placing bolt 90 in a horizontal position at the upper side of the adapter-tooth assembly, the bolt becomes a force transmitting member which transmits forces applied to the tooth to the adapter, thereby reducing the stresses to which other parts of the adapter are exposed.

What is claimed is:

1. A connector for securing to each other components at a digging end of earth-moving equipment which are subjected to contact with ground materials comprising,
a body having a hole extending through the body;
a bolt defining an axis having a shank adapted to extend into the hole and an enlarged head at an end of the shank;
cooperating thread formations defined on the shank and in the hole, the thread formations having cooperating matching cross-sections that decrease in an axial direction of the bolt from a vicinity of the head of the bolt towards another end of the bolt, the thread formations further extending over a circumference of less than 360'; and
wherein a periphery of the thread formation on the shank tapers and decreases in an axial direction towards the other end of the shank.

2. A connector according to claim 1, wherein the thread formations extend over an arc of no more than about 270°.

3. A connector according to claim 1, wherein one of the body and the bolt includes a protrusion and the other one of the body and the bolt includes a stop, the protrusion and the stop being arranged and cooperating to signal when the bolt has been turned relative to the body to a desired extent.

4. A connector according to claim 1 wherein the shank includes a longitudinal taper which decreases from the head towards an other end of the shank.

5. A connector according to claim 1, wherein one of the components comprising a bucket lip.

6. A connector according to claim 1, wherein the components comprise one or more of a shroud, a wear plate and an adapter.

7. A connector according to claim 6, wherein one of the components comprises a tooth of the earth-moving equipment.

8. A connector according to claim 1, including a retainer ring adapted to removably receive the enlarged head and rotatably mount the head to one of the components so that a portion of the shaft and the thread projects past a surface of the one component.

9. A connector according to claim 8, wherein a nut fixed to the other component and defining the other thread of the thread formation is formed to cooperate with the thread on the one of the components, and wherein the other component has a surface drawn into contact with the surface of the one component when the bolt is rotated relative to the nut to engage the thread formation.

10. A connector according to claim 9, wherein the one component is a lip of an earth moving bucket and the other member is a wear plate.

11. A connector according to claim 1 wherein the thread formation is on the head of the bolt and including a resilient force transmitting member between the thread formation on the head of the bolt and the shank.

12. A connector according to claim 11 wherein the head and the shank are separate components mounted to be movable relative to each other in axial and circumferential directions of the shank.

13. A connector according to claim 12 wherein one of the head and the shaft defines a radially oriented pin and the other one of the head and the shaft defines a pin receiving recess that limits relative movements between the pin and the recess and therewith between the head and the shaft in the axial and circumferential directions.

14. A connector according to claim 11 including an axial shaft on one of the head and the shank and a cooperating, axial bore in the other permitting the head and the shank to move axially and circumferentially relative to each other, and wherein the force transmitting member comprises a resiliently deformable part disposed between the head and the shank.

15. A connector according to claim 14 wherein the deformable part comprises an elastomeric layer between the head and the shank that is disposed about the shaft.

16. A connector according to claim 15 including a metallic washer disposed between at least one axial end of the elastomeric layer and the head or shank opposite the at least one axial end of the elastomeric layer.

17. A connector according to claim 1 wherein the thread formation on the bolt includes an upper end proximate the head having a relatively larger axial extent and a lower end remote from the head having a relatively shorter axial extent, and a detent resiliently projecting from the bolt at the lower end of the thread.

18. A connector according to claim 17 wherein the detent is positioned in substantial rotational alignment with the lower end of the thread.

19. A connector according to claim 1 wherein the body comprises a nut.

20. An assembly for earth moving equipment for releasably connecting a tooth thereof to an adapter for connection to a lip of an earth moving component bucket, the assembly comprising,
an adapter for connection to the lip of the earth moving component including a forward nose defined by forwardly tapering upper and lower surfaces and spaced-apart, substantially parallel side walls,
a tooth having a rearwardly open interior cavity configured and dimensioned to be received over and engaged by the nose of the adapter, and a forward digging end,
the adapter and the tooth, when engaged, defining an elongated bore between them which is open at least one end and which is defined by cooperating, adjacent sections of the adapter and the tooth configured for receiving a lock bolt that extends through the bore, and
the lock bolt in the bore having a head proximate the open end of the bore for substantially immovably securing the tooth to the adapter,
wherein the bolt and the bore define a cooperating thread formation including a generally helically curved thread and a cooperating helically curved groove extending over no more than 360°, wherein an axial height of the thread and the groove decreases in an axial direction away from the head,
wherein a periphery of the thread formation on the bolt decreases in an axial direction away from the head, and
whereby upon assembly of the adapter, the tooth and the bolt releasably secure the tooth to the adapter.

21. An assembly according to claim 20 wherein the bore and the bolt have an upright orientation.

22. An assembly according to claim 20 wherein the bore and the bolt have an approximately horizontal orientation.

23. An assembly according to claim 20 including a resiliently mounted metal detent projecting in substantial alignment with the helical thread in a radial direction, and a stop opening formed proximate the helical groove adapted to receive the metal detent associated with the helical thread to prevent unintended relative rotational movements between the helical thread and the helical groove.

24. An assembly according to claim 20 wherein each of the adapter and the nose defines a complete section of the bore extending over 360°, the respective bore sections being axially aligned and arranged over corresponding portions of a length of the bolt.

25. An assembly according to claim 22 wherein the bore is defined by opposing, rounded recesses in the nose and the adapter which extend over the length of the bolt, and wherein portions of the adapter and the nose defining the rounded recesses are configured to lock the nose to the adapter when the bolt is inserted into the bore.

26. An assembly according to claim 21 wherein the bore is defined by spaced-apart, full bore sections in the adapter which extend over 360° and over a portion of a length of the bore adjacent its respective ends, and a flange extending from the nose into a space between the bore sections on the adapter, a side of the flange facing the adapter defining a portion of the aperture and being configured to prevent separation of the nose from the adapter when the bolt is disposed in the bore.

27. An assembly for earth moving equipment for releasably connecting a tooth thereof to an adapter for connection to a lip of an earth moving component bucket, the assembly comprising, an adapter for connection to the lip of the earth moving component including a forward nose defined by forwardly tapering upper and lower surfaces and spaced-apart, substantially parallel side walls, a tooth having a rearwardly open interior cavity configured and dimensioned to be received over and engaged by the nose of the adapter, and a forward digging end, the adapter and the tooth, when engaged, defining an elongated bore between them which is open at least one end and which is defined by cooperating, adjacent sections of the adapter and the tooth configured for receiving a lock bolt that extends through the bore, and the lock bolt in the bore having a head proximate the open end of the bore for substantially immovably securing the tooth to the adapter, wherein the bolt and the bore define a cooperating thread formation including a generally helically curved thread and a cooperating helically curved groove extending over no more than 360°, wherein an axial height of the thread and the groove decreases in an axial direction away from the head, wherein a periphery of the thread formation on the bolt decreases in an axial direction away from the head, and whereby upon assembly of the adapter, the tooth and the bolt releasably secure the tooth to the adapter, and wherein the lock bolt comprises an enlarged cross-section head, a reduced diameter shaft depending from the head, a shank including a central aperture into which the shaft extends and in which the shaft is axially and rotationally movable, a pin extending radially from the shank into the shaft in the aperture limiting relative movements between the shank and the shaft, wherein the helical thread is formed on the head of the bolt and the helical groove is formed in the bore, and a radially projecting, movable metallic detent located proximate the helical thread resiliently biased into a stop hole foamed in the bore which releasably, substantially immovably locks the bolt in the bore in place.

* * * * *